(12) United States Patent
Hurst

(10) Patent No.: US 9,292,862 B2
(45) Date of Patent: *Mar. 22, 2016

(54) METHOD AND SYSTEM FOR SENDING MARKETING MESSAGES TO MOBILE-DEVICE USERS FROM A MOBILE-COMMERCE PLATFORM

(71) Applicant: MOCAPAY, INC., Denver, CO (US)

(72) Inventor: Douglas J. Hurst, Niwot, CO (US)

(73) Assignee: Mocapay, Inc., Denver, CO (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/277,446

(22) Filed: May 14, 2014

(65) Prior Publication Data

US 2014/0249922 A1 Sep. 4, 2014

Related U.S. Application Data

(63) Continuation of application No. 13/736,637, filed on Jan. 8, 2013, now Pat. No. 8,761,738, which is a continuation of application No. 12/475,746, filed on Jun. 1, 2009, now Pat. No. 8,374,588.

(60) Provisional application No. 61/058,143, filed on Jun. 2, 2008.

(51) Int. Cl.
 *G06Q 30/02* (2012.01)
 *H04M 3/487* (2006.01)
 *H04M 3/42* (2006.01)

(52) U.S. Cl.
 CPC ............ *G06Q 30/0255* (2013.01); *G06Q 30/02* (2013.01); *G06Q 30/0267* (2013.01);
 (Continued)

(58) Field of Classification Search
 CPC ....... G06Q 40/02; G06Q 20/20; G06Q 30/02; H04M 2201/36; H04M 2207/18
 USPC .................. 455/406, 410, 414.1, 414.2, 456.1
 See application file for complete search history.

(56) References Cited

U.S. PATENT DOCUMENTS 5,991,749 A 11/1999 Morrill
6,675,153 B1 1/2004 Cook et al.
(Continued)

FOREIGN PATENT DOCUMENTS

EP 2122557 11/2009
WO WO-2008-089383 A2 7/2008

OTHER PUBLICATIONS

International Search Report and Written Opinion, Int'l App. No. PCT/US08/51395, dated Jul. 8, 2008, 7 pgs.
(Continued)

*Primary Examiner* — Sam Bhattacharya
(74) *Attorney, Agent, or Firm* — Holland & Hart LLP

(57) ABSTRACT

Methods and systems for sending marketing messages to mobile-device users from a mobile-commerce platform are described. In various illustrative embodiments, a marketing message is transmitted to a mobile-device user before, during, or after a transaction between the mobile-device user's mobile device and the mobile-commerce platform. The marketing message can be generated and timed based on rules input to the mobile-commerce platform by a merchant and can be based on historical transaction data associated with the mobile-device user, transaction parameters associated with a current or a most-recently-completed transaction involving the mobile-device user, a transaction type of a current or a most-recently-completed transaction involving the mobile-device user, or a combination thereof, depending on the particular embodiment.

(52) U.S. Cl.
CPC .......... *H04M3/4878* (2013.01); *H04M 3/4211* (2013.01); *H04M 2201/36* (2013.01); *H04M 2207/18* (2013.01)

(56) References Cited

U.S. PATENT DOCUMENTS

| | | | |
|---|---|---|---|
| 7,043,461 | B2 | 5/2006 | Strayer et al. |
| 7,155,411 | B1 | 12/2006 | Blinn et al. |
| RE39,736 | E | 7/2007 | Morrill |
| 7,275,685 | B2 | 10/2007 | Gray et al. |
| 7,315,828 | B1 | 1/2008 | McCarthy et al. |
| 7,337,144 | B1 | 2/2008 | Blinn et al. |
| 7,395,242 | B2 | 7/2008 | Blinn et al. |
| 7,398,250 | B2 | 7/2008 | Blinn et al. |
| 7,512,552 | B2 | 3/2009 | Karas et al. |
| 7,657,489 | B2 | 2/2010 | Stambaugh |
| 7,707,120 | B2 | 4/2010 | Dominguez et al. |
| 7,716,082 | B1 | 5/2010 | Blalock |
| 8,083,135 | B2 | 12/2011 | Hodgkinson et al. |
| 8,374,588 | B2 * | 2/2013 | Hurst .................... 455/414.1 |
| 2001/0029496 | A1 | 10/2001 | Otto et al. |
| 2002/0059146 | A1 | 5/2002 | Keech |
| 2002/0181710 | A1 | 12/2002 | Adam et al. |
| 2003/0018579 | A1 | 1/2003 | Litster et al. |
| 2003/0053609 | A1 | 3/2003 | Risafi et al. |
| 2003/0154139 | A1 | 8/2003 | Woo |
| 2003/0200184 | A1 | 10/2003 | Dominguez et al. |
| 2004/0030659 | A1 | 2/2004 | Gueh |
| 2004/0049455 | A1 | 3/2004 | Mohsenzadeh |
| 2004/0103060 | A1 | 5/2004 | Foth et al. |
| 2004/0122685 | A1 | 6/2004 | Bunce |
| 2004/0230536 | A1 | 11/2004 | Fung et al. |
| 2005/0033686 | A1 | 2/2005 | Peart et al. |
| 2005/0177517 | A1 | 8/2005 | Leung |
| 2006/0016880 | A1 | 1/2006 | Singer |
| 2006/0111983 | A1 | 5/2006 | Malison |
| 2006/0224470 | A1 | 10/2006 | Garcia Ruano et al. |
| 2006/0235795 | A1 | 10/2006 | Johnson et al. |
| 2006/0235796 | A1 | 10/2006 | Johnson et al. |
| 2006/0265243 | A1 | 11/2006 | Racho et al. |
| 2007/0022058 | A1 | 1/2007 | Labrou et al. |
| 2007/0063020 | A1 | 3/2007 | Barrafto |
| 2007/0138268 | A1 | 6/2007 | Tuchman |
| 2007/0175978 | A1 | 8/2007 | Stambaugh |
| 2007/0179888 | A1 | 8/2007 | Angelovich |
| 2007/0198354 | A1 | 8/2007 | Senghore et al. |
| 2007/0203778 | A1 | 8/2007 | Lowson et al. |
| 2007/0205275 | A1 | 9/2007 | Nicola et al. |
| 2007/0239556 | A1 | 10/2007 | Wagner |
| 2007/0288392 | A1 | 12/2007 | Peng et al. |
| 2008/0011825 | A1 | 1/2008 | Giordano et al. |
| 2008/0046366 | A1 | 2/2008 | Bemmel et al. |
| 2008/0052164 | A1 | 2/2008 | Abifaker |
| 2008/0052189 | A1 | 2/2008 | Walker et al. |
| 2008/0077527 | A1 | 3/2008 | Choe et al. |
| 2008/0097851 | A1 | 4/2008 | Bemmel et al. |
| 2008/0103984 | A1 | 5/2008 | Choe et al. |
| 2008/0189189 | A1 | 8/2008 | Morgenstern |
| 2008/0207234 | A1 | 8/2008 | Arthur et al. |
| 2008/0208744 | A1 | 8/2008 | Arthur et al. |
| 2008/0208762 | A1 | 8/2008 | Arthur et al. |
| 2008/0223918 | A1 | 9/2008 | Williams et al. |
| 2008/0249938 | A1 | 10/2008 | Drake-Stoker |
| 2008/0255941 | A1 | 10/2008 | Otto et al. |
| 2008/0255947 | A1 | 10/2008 | Friedman |
| 2008/0267117 | A1 | 10/2008 | Stern |
| 2008/0281737 | A1 | 11/2008 | Fajardo |
| 2008/0296368 | A1 | 12/2008 | Newsom |
| 2009/0012901 | A1 | 1/2009 | Singh et al. |
| 2009/0037286 | A1 | 2/2009 | Foster |
| 2009/0063312 | A1 | 3/2009 | Hurst |
| 2009/0138366 | A1 | 5/2009 | Bemmel et al. |
| 2009/0164326 | A1 | 6/2009 | Bishop et al. |
| 2009/0164331 | A1 | 6/2009 | Bishop et al. |
| 2009/0171804 | A1 | 7/2009 | Lee et al. |
| 2009/0179074 | A1 | 7/2009 | Hurst |
| 2009/0182663 | A1 | 7/2009 | Hurst |
| 2009/0182676 | A1 | 7/2009 | Barbier et al. |
| 2009/0265241 | A1 | 10/2009 | Bishop et al. |
| 2009/0307132 | A1 | 12/2009 | Phillips |
| 2010/0030698 | A1 | 2/2010 | Goodin |
| 2010/0041368 | A1 | 2/2010 | Kumar |
| 2012/0028612 | A1 | 2/2012 | Hurst |
| 2012/0030044 | A1 | 2/2012 | Hurst |

OTHER PUBLICATIONS

European Search Report and Opinion, EP App. No. 08705998.6, dated Dec. 29, 2010, 5 pgs.

* cited by examiner

METHOD AND SYSTEM FOR SENDING MARKETING MESSAGES TO MOBILE-DEVICE USERS FROM A MOBILE-COMMERCE PLATFORM

PRIORITY

The present invention is a continuation U.S. patent application Ser. No. 13/736,637, filed Jan. 8, 2013, entitled "Method and System for Sending Marketing Messages to Mobile-Device Users from a Mobile-Commerce Platform," which is a continuation of U.S. patent application Ser. No. 12/475,746, filed Jun. 1, 2009 by Douglas J. Hurst, entitled "Method and System for Sending Marketing Messages to Mobile-Device Users from a Mobile-Commerce Platform," which claims priority from commonly owned and assigned U.S. Provisional Patent Application No. 61,058,143, filed on Jun. 2, 2008, each of which is incorporated herein by reference in its entirety for all purposes.

RELATED APPLICATIONS

The present application is related to the following commonly owned and assigned U.S. patent application Ser. No. 11/624,620, entitled "Systems and Method for Secure Wireless Payment Transactions," filed on Jan. 18, 2007; and application Ser. No. 12/343,423, entitled "System and Method for Distributing Mobile Gift Cards," filed on Dec. 23, 2008; both of which are incorporated herein by reference in their entirety.

FIELD OF THE INVENTION

The present invention relates generally to electronic commerce. More specifically, but not by way of limitation, the present invention relates to methods and systems for sending marketing messages to mobile-device users from a mobile-commerce platform.

BACKGROUND OF THE INVENTION

Merchants are always looking for new channels through which to market their products to potential customers. Marketing channels such as newspapers; magazines; television; radio; posters; signs on bus-stop benches; signs on taxi cabs, buses, and other forms of public transportation; and so-called "junk mail" have been in wide use for many years. One marketing channel that has come along more recently is the portion of the Internet known as the World Wide Web (the "Web").

The Internet also supports a wide variety of electronic-commerce systems, including secure ireless-payment systems that permit a user to pay for goods and services using a mobile device such as a cellular telephone. Though such mobile electronic-commerce systems are increasing, in popularity, such systems have significant untapped potential as channels through which marketing messages can be transmitted to mobile-device users.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and system for sending marketing messages to mobile-device users from a mobile-commerce platform. One illustrative embodiment is a computer-server-based method for sending marketing messages to mobile-device users from a mobile-commerce platform, comprising ascertaining, while a mobile-device user is engaged in a transaction with the mobile-commerce platform, a transaction type of the transaction, wherein the mobile-commerce platform includes the computer server; acquiring parameters associated with the transaction; accessing historical transaction data associated with the mobile-device user; generating a marketing message for the mobile-device user based on the transaction type, the parameters associated with the transaction, and the historical transaction data associated with the mobile-device user; and transmitting the marketing message to the mobile device of the while-device user while the mobile-device user is still engaged in the transaction.

Another illustrative embodiment is a computer-server-based method for sending marketing messages to mobile-device users from a mobile-commerce platform, comprising ascertaining, after a mobile-device user has completed a most-recent transaction with the mobile-commerce platform, a transaction type of the most-recent transaction, wherein the mobile-commerce platform includes the computer server; acquiring parameters associated with the most-recent transaction; accessing historical transaction data associated with the mobile-device user; generating a marketing message for the mobile-device user based on the transaction type, the parameters associated with the most-recent transaction, and the historical transaction data associated with the mobile device user; and transmitting the marketing message to the mobile device of the mobile-device user.

Yet another illustrative embodiment is a computer-server-based method for sending marketing messages to mobile-device users from a mobile-commerce platform, comprising accessing historical transaction data associated with a mobile-device user and stored in the mobile-commerce platform, wherein the mobile-commerce platform includes the computer server; determining, from the historical transaction data, that the mobile-device user has not shopped with a particular merchant for a predetermined period; generating a marketing message for the mobile-device user encouraging the mobile-device user to shop with the particular merchant and transmitting the marketing message to the mobile device of the mobile-device user.

These and other embodiments are described in further detail herein. Systems implementing the methods of the invention are also described.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

In various illustrative embodiments of the invention, meaningful, targeted marketing messages are transmitted to mobile-device users from a mobile-commerce platform. A marketing message may be transmitted to a user's mobile device before, during, or after a transaction between the mobile device and the mobile-commerce platform. Such a marketing message may be based on historical transaction data, parameters associated with an in-progress or most-recently-completed transaction, a knowledge of the nature of the in-progress or most-recently-completed transaction, or a combination of these, depending on the particular embodiment.

Figure 1:
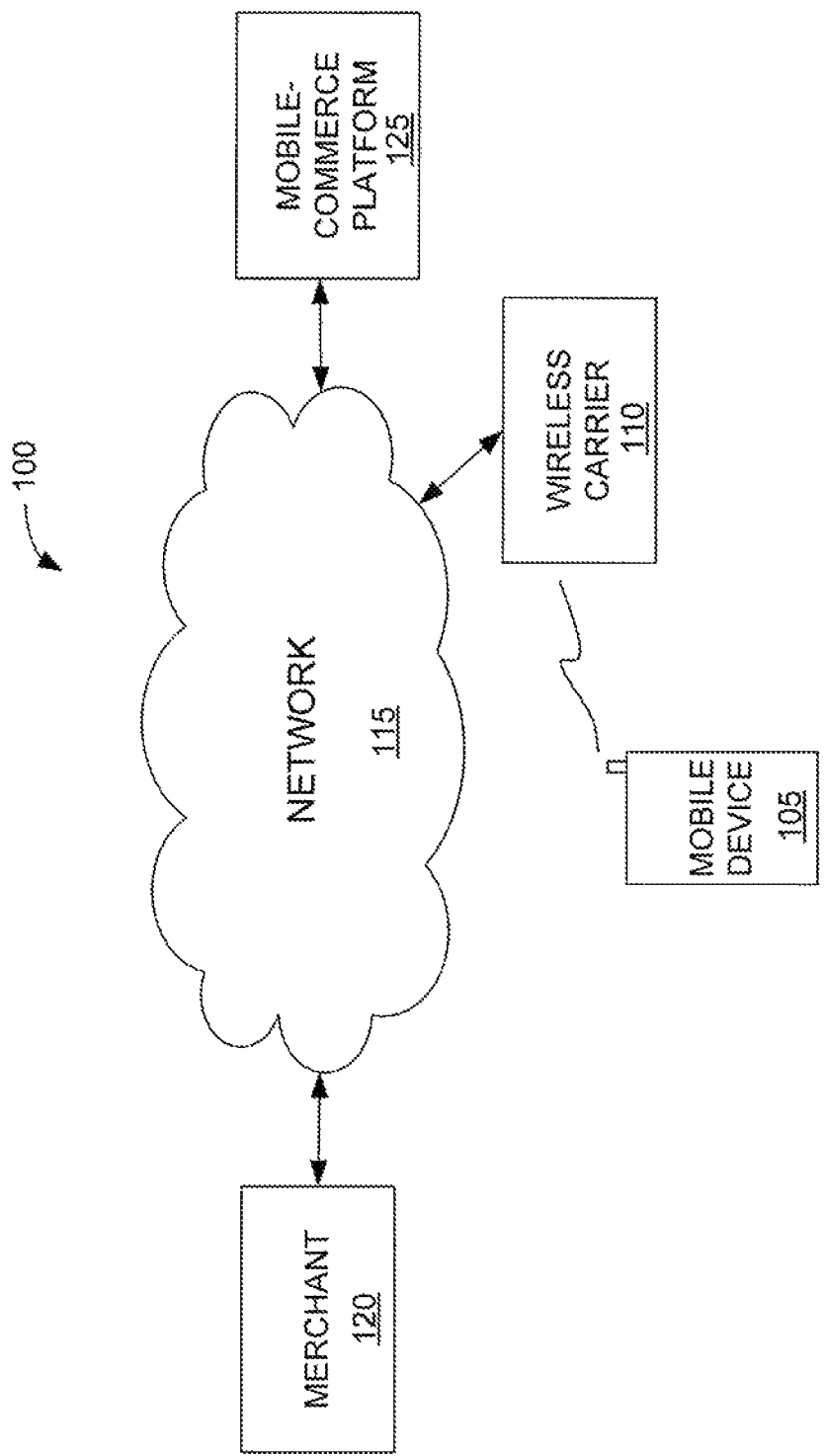
FIG. 1 is a functional block diagram of an environment in which various illustrative embodiments of the invention can be implemented.

Referring now to the drawings, where like or similar elements are designated with identical reference numerals throughout the several views, and referring in particular to FIG. 1, it is a functional block diagram of an environment 100 in which various illustrative embodiments of the invention can be implemented. Environment 100 includes network 115, which interconnects one or more merchants 120, one or more wireless carriers 110 (e.g., SPRINT, T-MOBILE, AT&T, etc.), and mobile-commerce platform 125. In some embodiments, network 115 includes, but is not necessarily limited to the Internet. Merchant 120 sells goods, services, or both at traditional brick-and-mortar stores, on-line, or both at traditional brick-and-mortar stores and on-line.

Mobile device 105 associated with a particular user can communicate with the various nodes of network 115 via wireless carrier 110. Specifically, the user can use mobile device 105 to purchase goods or services from a merchant 120 by interacting with mobile-commerce platform 125 over network 115 in a manner that will be explained. below. Depending on the particular embodiment, mobile device 105 can be a cellular telephone, Personal Communication Service (PCS) phone, Personal Digital Assistant (PDA), or other portable communication device.

Illustrative mobile-commerce platforms are described in U.S. patent application Ser. No. 11/624,620, "Systems and Method for Secure Wireless Payment Transactions" (the "'620 Application"). Since the '620 Application provides a detailed explanation of such platforms, only a brief summary of their operation is included below herein. In these illustrative mobile-commerce platforms, a user can select from as variety of different tenders (forms of payment), including mobile gift cards. The distribution and use of mobile gift cards is described, in U.S. patent application Ser. No. 12/343, 423, "System and Method for Distributing Mobile Gift Cards" (the "'423 Application").

Figure 2:
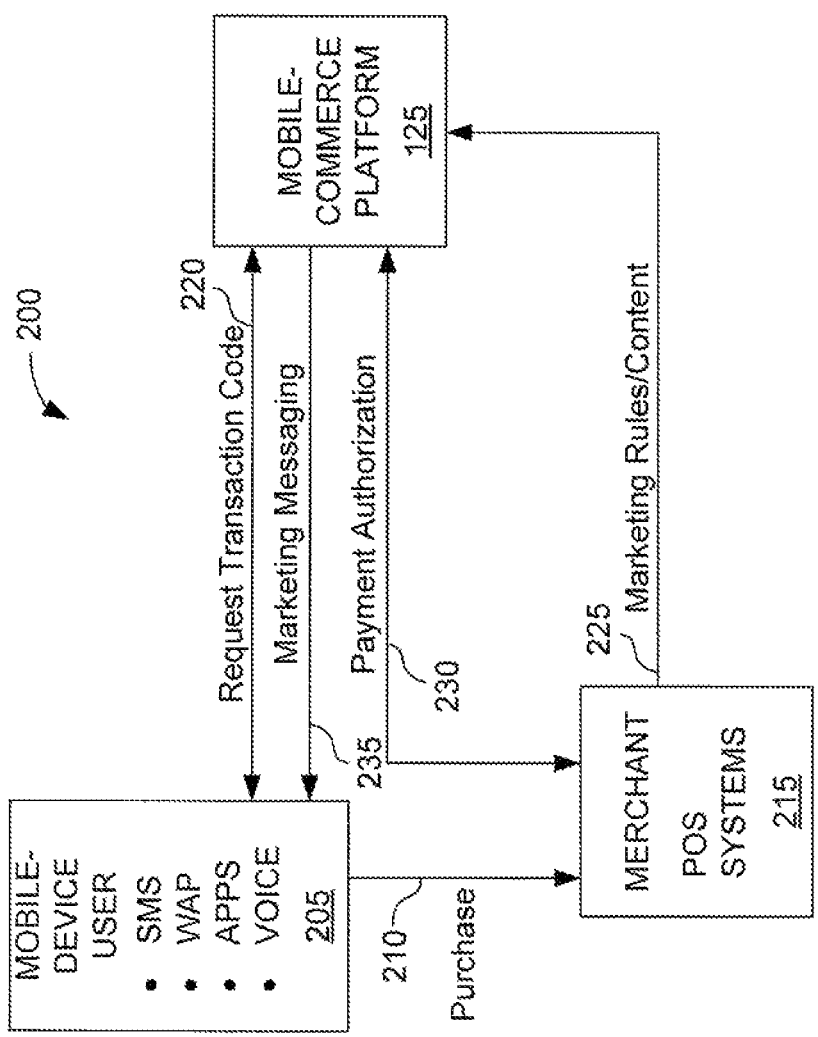
FIG. 2 is a diagram showing interactions of a mobile user with a merchant point-of-sale (POS) system and a mobile-commerce platform in accordance with an illustrative. embodiment of the invention.

FIG. 2 is a diagram showing interactions of a mobile-device user 205 with a merchant point-of-sale (POS) system 215 and a mobile-commerce platform 125 in accordance with an illustrative embodiment of the invention. In the discussion of FIG. 2 that follows, the various interactions are identified by their corresponding reference numerals in parentheses.

in some embodiments, mobile-device user 205 can use a variety of different access methods such as, without limitation, Short Message Service (SMS) messages, Multimedia Message Service (MMS) messages, Wireless Access Protocol (WAP), an application, or voice to obtain one-use perishable transaction codes or authorization codes (220) from mobile-commerce platform 125 in making payments from any of a variety of different tenders. Mobile-device user 205 can also use a variety of methods, including the above examples, to provide the one-use perishable authorization codes to merchant's POS 215 in making electronic purchases (210).

Mobile-device user 205 may also receive targeted marketing messages (235) before, during, or after a transaction between mobile device 105 (see FIG. 1) and mobile-commerce platform 125. The targeted marketing messages can be generated and timed in accordance with marketing rules, content, or both (225) that are input to mobile-commerce platform 125 by merchants 120. Further details regarding marketing messages 235 are provided below.

Merchant. POS system 215 receives payment authorizations (230) from mobile-commerce platform 125 in conjunction with the mobile payments technology mentioned above in connection with the '620 Application.

When mobile-device user 205 makes a purchase, mobile-device user 205 contacts mobile-commerce platform 125 using any of a variety of access methods (e.g., SMS, MMS, WAP or other browser technology, application, voice) to provide an optional personal identification number (PIN) by which mobile-commerce platform 125 authenticates mobile-device user 205. Depending on the particular embodiment, other factors besides the optional PIN or a combination of factors may be used in authenticating mobile-device user 205.

Mobile-commerce platform 125 provides mobile-device user 205 with one-time perishable (time-limited) authorization codes (235) and balances for various tenders available to that user. Mobile-device user 205 selects a specific tender to be used in making the purchase. The mobile-payments-enabled merchant 120 (see FIG. 1) submits, from merchant POS system 215, the authorization code provided by mobile-device user 205 and the transaction amount to mobile-commerce platform 125 (230). If everything checks out, mobile-commerce platform 125 transmits a return authorization to the merchant's POS system 215, completing the transaction (230).

With this high-level background in place, the remainder of this Detailed Description focuses primarily on the transmission of marketing messages 235 to mobile-device users 205 (interactions 225 and 235 in FIG, 2).

Figure 3:
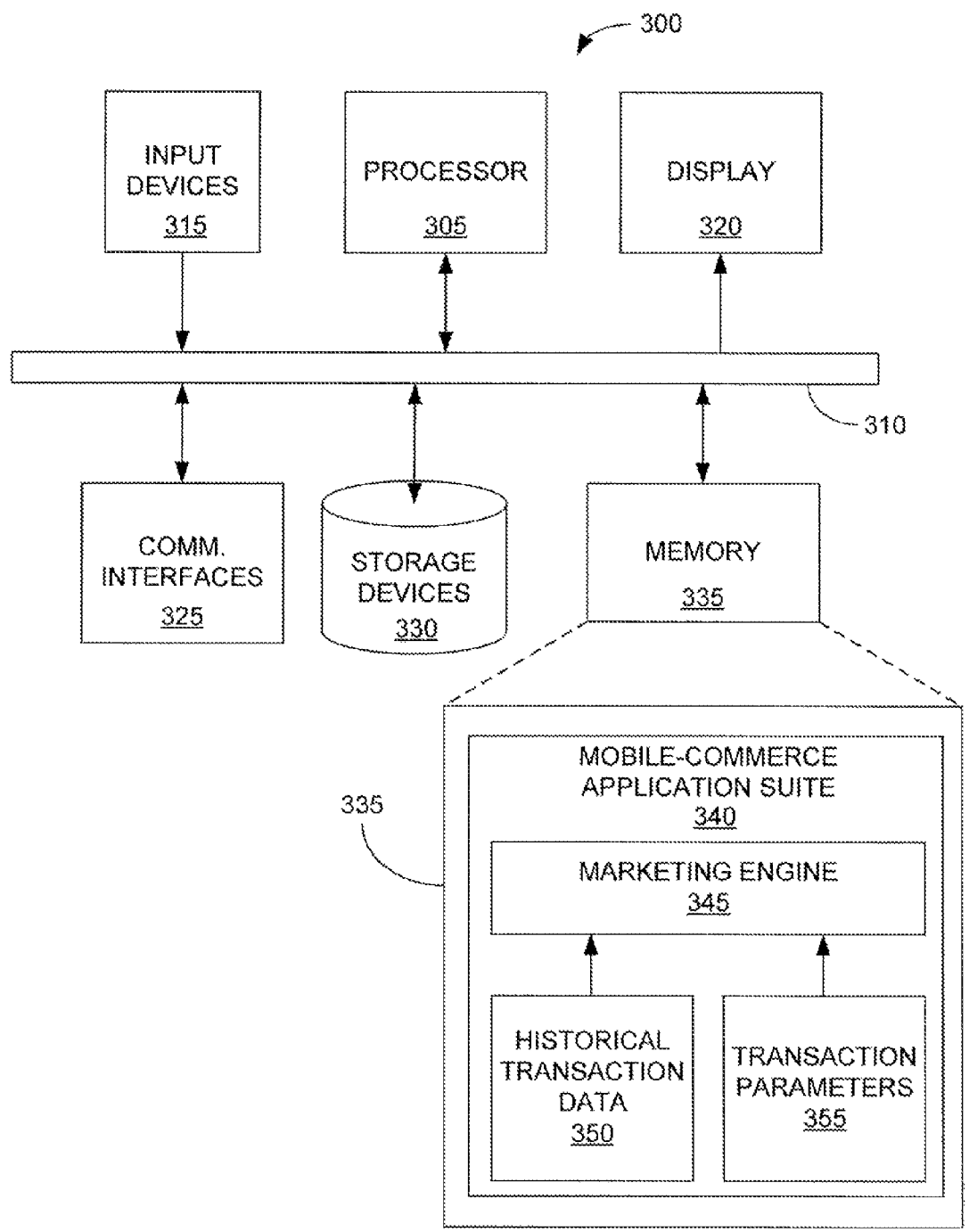
FIG. 3 is a functional block diagram of a computer server that hosts a mobile-commerce application suite in accordance with an illustrative embodiment of the invention.

FIG. 3 is a functional block diagram of a computer server ("server") 300 that hosts a mobile-commerce application suite in accordance with an illustrative embodiment of the invention. In this embodiment, server 300 is part of mobile-commerce platform 125 (see FIG. 2), In FIG. 3, processor 305 communicates over data bus 310 with input devices 315, display 320, communication interfaces ("COMM.INTERFACES" in FIG. 3) 325, storage devices 330 (e.g., hard disk drives or flash memory), and memory 335, Though FIG. 3 shows only a single processor, multiple processors or a multi-core processor may be present in sonic embodiments.

Input devices 315 include, for example, a keyboard, a mouse or other pointing device, or other devices that are used to input data or commands to server 300 to control its operation. Communication interfaces 325 may include, for example, various serial or parallel interfaces for communicating with network 115 (see FIG. 1) or one or more peripherals.

Memory 335 may include, without limitation, random access memory (RAM), read-only memory (ROM), flash memory, magnetic storage (e.g., a hard disk drive), optical storage, or a combination of these, depending on the particular embodiment.

In FIG. 3, memory 335 includes mobile-commerce application suite 340. For simplicity, only the modules of mobile-commerce application suite 340 that are pertinent to the present description are shown in FIG. 3. In a typical embodiment, functional modules for account management, mobility services, settlement, reporting and administration, and marketplace (discovery and activation of mobile tenders) are also included in mobile-commerce application suite 340.

Figure 4:
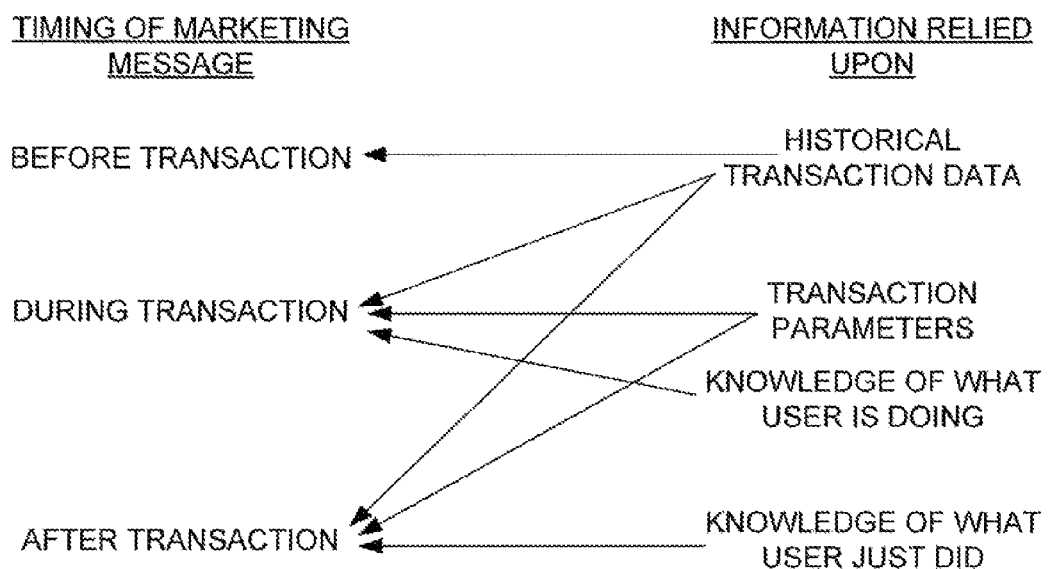
FIG. 4 is a diagram that summarizes the kinds of information relied upon in generating marketing messages in various illustrative embodiments of the invention.

In FIG. 3, mobile-commerce application suite 340 includes marketing engine 345, which generates and transmits marketing messages to mobile-device users 205. As will be explained in further detail below, marketing engine 345 may generate and transmit marketing messages to a mobile-device user 205 before, during, or after a transaction between that mobile device user's mobile device 105 and mobile-commerce platform 125. In doing so, marketing engine 345 may make use of historical transaction data 350, transaction parameters 355, and a knowledge of the type of transaction in which the mobile-device user is currently engaged or in which the mobile-device user was most recently engaged, depending on the particular embodiment. FIG. 4 summarizes the kinds of information marketing engine 345 uses in generating marketing messages (see element 235 in FIG. 2.) in various illustrative embodiments of the invention.

Referring once again to FIG. 3, in one illustrative embodiment, mobile-commerce application suite 340 is implemented as software that is executed by processor 305. Such software may be stored, prior to its being loaded into RAM for execution by processor 305, on any suitable computer-readable storage medium such as a hard disk drive, an optical disk, or a flash memory. In general, the functionality of mobile-commerce application suite 340 may be implemented as software, firmware, hardware, or any combination or sub-combination thereof.

The methods carried out by mobile-commerce application suite 340 are described below in connection with FIGS. 5-7. Herein, the term "transaction" is not limited to a purchase from a merchant 120 or other entity by a mobile-device user 205. Rather, a "transaction," herein, refers to any of a wide variety of interactions between a mobile-device user 205 and mobile-commerce platform 125 via network 115. In general, such transactions typically involve one or more requests from mobile-device user 205 and one or more responses from mobile-commerce platform 125. Examples of various types of transactions are discussed below.

Figure 5:
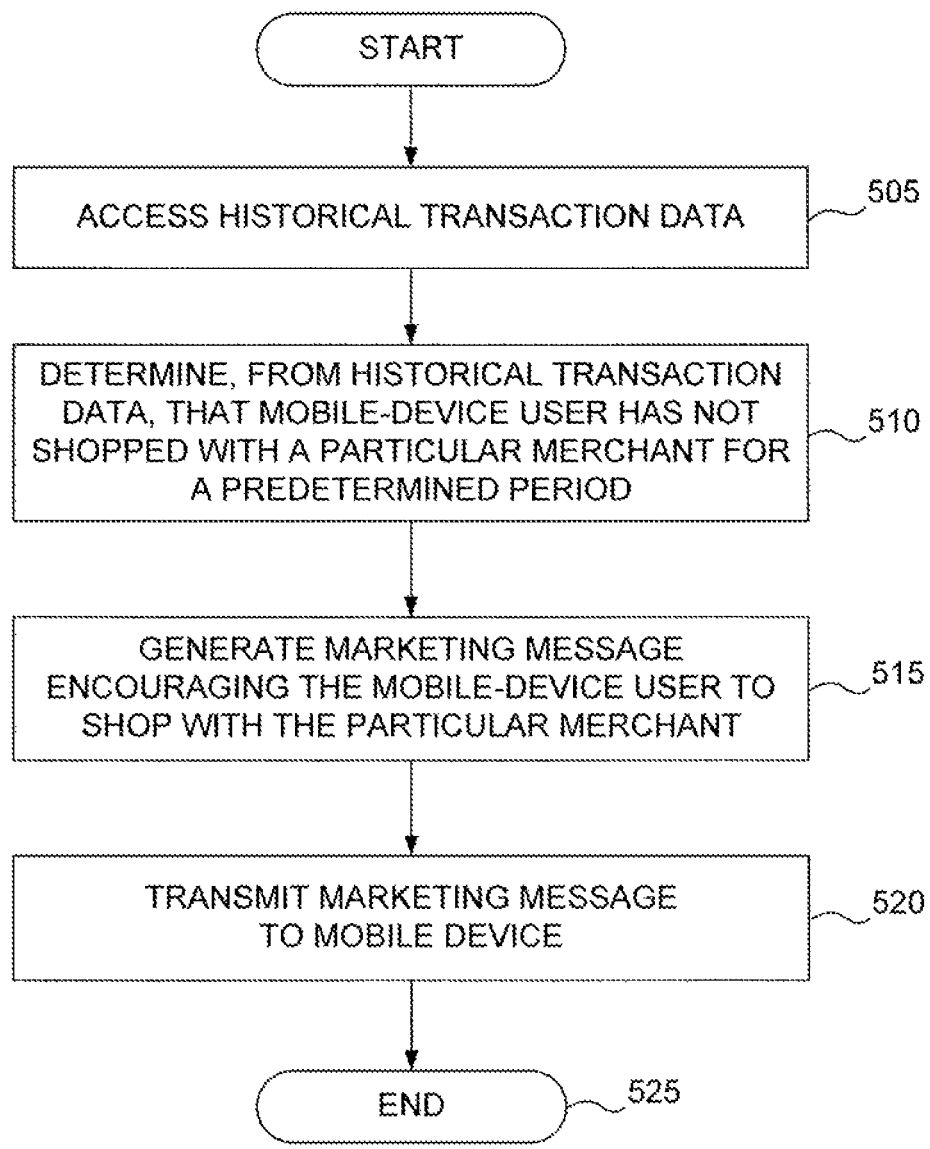
FIG. 5 is a flowchart of a method for sending marketing messages to mobile-device users from a mobile-commerce platform in accordance with an illustrative embodiment of the invention.

FIG. 5 is a flowchart of a method for sending marketing messages to mobile-device users from a mobile-commerce platform in accordance with an illustrative embodiment of the invention. In the embodiment of FRI. 5, a marketing message 235 is sent to a mobile-device user 205 before a specific transaction has taken place. At 505, marketing engine 345 accesses historical transaction data 350 that is associated with a mobile-device user 205. At 510, marketing engine 345 determines, based on historical transaction data 350, that the mobile-device user 205 has not shopped with (purchased merchandise or services from) a particular merchant 120 for a predetermined period. That predetermined period (e.g., six months) can, in some embodiments, be specified as part of the rules input to mobile-commerce platform 125 by the particular merchant 120 (see element 225 in FIG. 2).

At 515, marketing engine 345 generates a marketing message 235 encouraging the mobile-device user 205 to shop with the particular merchant 120. The content of the marketing message 235 can also be governed, at least in part, by the rules input to mobile-commerce platform 125 by the particular merchant 120.

Marketing message 235 may include, without limitation, one or more of a coupon, an advertisement, an offer of a discount, and an informational message.

At 520, mobile-commerce application suite 340 transmits marketing message 235 to the mobile device 105 associated with the mobile-device user 205 via network 115. The process terminates at 525, In one embodiment, marketing engine 345, in addition to determining that a specified period has elapsed without mobile-device user 205 having shopped with the particular merchant 120, also determines that the mobile-device user 205 has an unused balance on a mobile gift card associated with the particular merchant 120. In such a situation, marketing message 235 may also include an invitation to the mobile-device user 205 from the particular merchant 120 to use the unused balance on the mobile gift card. This capability provides a valuable service to both consumers and merchants because, in some U.S. states, unused gift-card balances escheat to the state government after a specified period. This capability of mobile-commerce platform 125 helps prevent such undesirable escheatment by reminding mobile-gift-card owners of their unused balances.

As explained in the '423 Application, in this embodiment, mobile-commerce platform 125 acts as a server-side wallet for the mobile gift card, the mobile gift card being usable, through interaction with mobile-commerce platform 125, by the mobile-device user 205 for the purchase of goods or services from the particular merchant 120.

Figure 6:
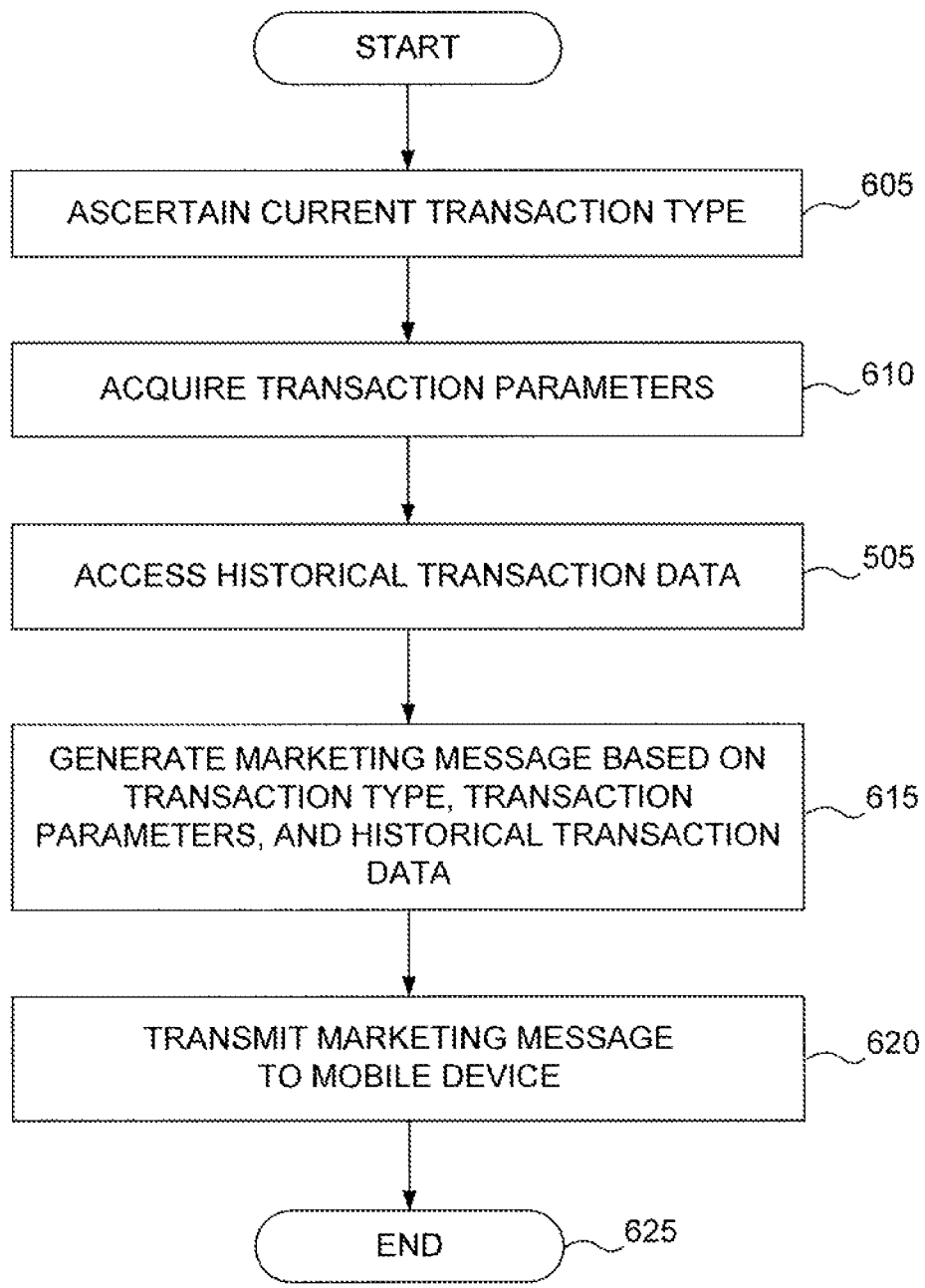
FIG. 6 is a flowchart of a method for sending marketing messages to mobile-device users from a mobile-commerce platform in accordance with another illustrative embodiment of the invention.

FIG. 6 is a flowchart of a method for sending marketing messages to mobile-device users from a mobile-commerce platform in accordance with another illustrative embodiment of the invention. In the embodiment of FIG. 6, a marketing message 235 is transmitted to a mobile-device user 205 during a transaction. In such an embodiment, the type of transaction can be, without limitation, searching for a geographical location of a merchant 120, requesting a transaction code for making a purchase (see element 220 in FIG. 2), selecting a particular tender for a purchase, requesting an account balance, searching the mobile-device user's transaction history, or requesting a reload of funds on the mobile-device user's account.

At 605, marketing engine 345 ascertains the transaction type see above) of a transaction in which the mobile-device user 205 is currently engaged. At 610, marketing engine 345 acquires transaction parameters 355 associated with the transaction in progress. Such transaction parameters 355 could include, without limitation, the geographical location of the mobile device 105 as reported by the mobile device 105, a merchant-identification code that uniquely identifies a merchant 120, user-account data associated with the mobile device. 105, application data associated with the mobile device 105 (e.g., that the mobile device 105 is an SIMONE made by APPLE COMPUTER), and security parameters (e.g., digital keys) associated with the mobile-device user 205, At 505 (see also FIG. 5), marketing engine 345 accesses historical transaction data 350 associated with mobile-device user 205.

At 615, marketing engine 345 generates a marketing, message 235 based on the type of transaction in which mobile-device user 205 is currently engaged, the associated transaction parameters 355, and the historical transaction data 350.

Consider, as merely one example, a situation in which a mobile-device user 205 is looking for STARBUCKS COFFEE COMPANY locations near his or her current location. The user can contact mobile-commerce platform 125 using mobile device 105 to conduct such a search.

During this geographical-search transaction, marketing engine 345 determines that the mobile-device user 205 is in Dallas. Texas, and that, based on rules and marketing content previously input to mobile-commerce platform 125 by STARBUCKS, a local STARBUCKS in Dallas is featuring a gig by a popular local musical performer. Based on historical transaction data 350, marketing engine 345 also determines that the mobile-device user 205 has attended past concerts by the local artist. Based on this combination of information, marketing engine 345 transmits to mobile-device user 205 a targeted marketing message 235 that not only informs the user of the particular Dallas STARBUCKS location but also of the upcoming musical performance. Such a marketing message 235 could also include one or more of the following: a coupon (e.g., for a free cup of coffee or a free ticket for the gig), an advertisement for coffee or other STARBUCKS products, a discount offer, or any appropriate informational message, as mentioned above.

The foregoing scenario is merely one example of how knowledge of a current transaction type, historical transaction data 350, and transaction parameters 355 can be combined in generating a suitable marketing message 235. Those skilled in the applicable art will see many other applications for the features and capabilities described herein.

At 620, mobile-commerce application suite 340 transmits the marketing message 235 to the mobile device 105 associated with the mobile-device user 205 while. the mobile-device user 205 is still engaged in the transaction. At 625, the process terminates.

Figure 7:
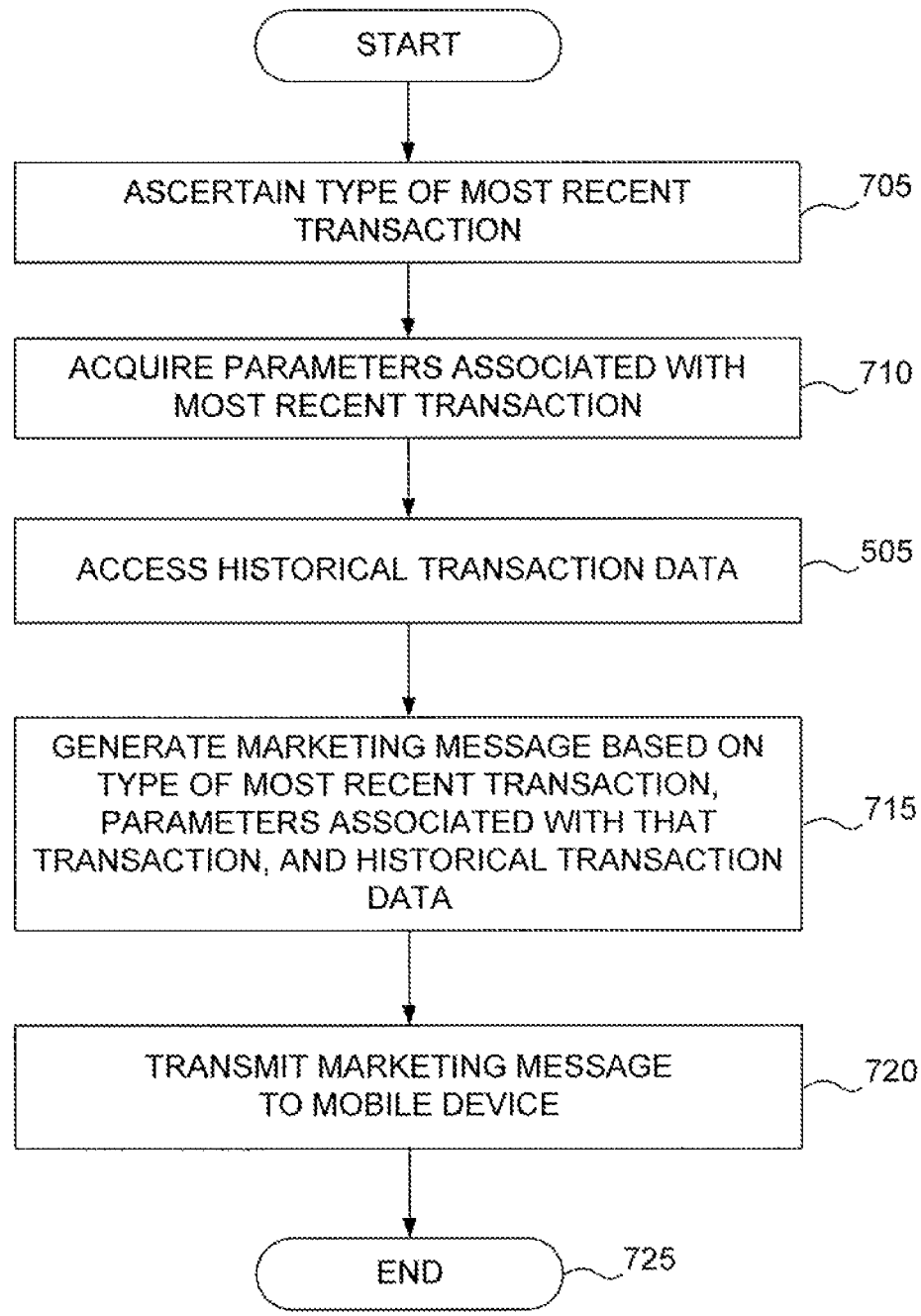
FIG. 7 is a flowchart of a method for sending marketing messages to device users from a mobile-commerce platform in accordance with yet another illustrative embodiment of the invention.

FIG. 7 is a flowchart of a method for sending marketing messages to mobile-device users from a mobile-commerce platform in accordance with yet another illustrative embodiment of the invention. In the embodiment of FIG. 7, a marketing message 235 is transmitted to a mobile-device user 205 sometime after a most-recently-completed transaction. In such an embodiment, the transaction type (the type of the most-recently-completed transaction) be, without limitation, a sale (purchase), a void, a purchase by a mobile-device user 205 of a gift card for another mobile-device user 205, a credit, and a reload of funds.

At 705, marketing engine 345 ascertains the transaction type of the most recent transaction completed by a mobile-device user 205. At 710, marketing engine 345 acquires transaction parameters 355 associated with the most-recently-completed transaction. The transaction parameters 355 are, generally, the same kinds of transaction parameters 355 as those discussed above in connection with the embodiment of FIG. 6.

At 505 (see also FIG. 5), marketing engine 345 accesses historical transaction data 350 associated with mobile-device user 205.

At 715, marketing engine 345 generates a marketing message 235 based on the transaction type of the most-recently-completed transaction, the parameters 355 associated with that transaction, and the historical transaction data 350. Consider, as merely one example, a scenario in which Mobile-Device User A purchases a mobile gift card for a friend, Mobile-Device User B (see the '423 Application for further details about how this can be done in an illustrative embodiment). Marketing engine 345 determines that Mobile-Device User A has purchased a $50 TARGET mobile gift card for Mobile-Device User B. Marketing engine. 345 also determines, based on historical transaction data 350, that Mobile-Device User A is a frequent shopper at TARGET. Additionally, marketing engine 345 determines that Mobile-Device User A has an account balance loaded from a particular tender (e.g., a credit or debit card) of $200, which exceeds the price of a particular featured item at TARGET.

Based on the forgoing combination of transaction type (the gift-card purchase), historical transaction data 350 (frequent shopping at TARGET), and transaction parameters 355 (the current account balance), marketing engine 345 can transmit a tailored, targeted marketing message 235 to Mobile-Device User A advertising the particular featured item mentioned above as a special offer to Mobile-Device User A to reward Mobile-Device User A for both the gift-card purchase and for being a regular, loyal customer. Such a marketing message 235 can be generated in accordance with marketing rules and content (see element 225 in FIG. 2) previously input to mobile-commerce platform 125 by a TARGET representative. The foregoing scenario is merely one example of how knowledge of the type of a most-recently-completed transaction, historical transaction data 350, and transaction parameters 355 can be combined in generating a relevant marketing message 235. Those skilled in the applicable art will see many other applications for the features and capabilities described herein.

At 720, mobile-commerce application suite 340 transmits the marketing message 235 to the mobile device 105 associated with the mobile-device user 205. At 725, the process terminates.

In conclusion, the present invention provides, among other things, methods and systems for sending marketing messages to mobile-device users from a mobile-commerce platform. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention as expressed in the claims.

What is claimed is:

1. A computer-server-based method for sending marketing messages to mobile device users from a mobile commerce platform, the computer-server-based method comprising:
   receiving a request from a mobile device user for a perishable transaction code in connection with a transaction;
   determining a type of the transaction based on the request for the perishable transaction code;
   accessing historical transaction data associated with the mobile device user; and
   transmitting a marketing message to a mobile device of the mobile device user, wherein the marketing message is based on the type of the transaction, the historical transaction data, and the request for the perishable transaction code.

2. The computer-server-based method of claim 1, wherein the type of the transaction comprises one or more of: a sale, a void, a gift card purchase, a credit, or a reload.

3. The computer-server-based method of claim 1, wherein transmitting the marketing message to the mobile device occurs while the mobile device user is engaged in the transaction.

4. The computer-server-based method of claim 1, wherein transmitting the marketing message to the mobile device occurs after the transaction has completed.

5. The computer-server-based method of claim 1, wherein the marketing message comprises one or more of: a coupon, an advertisement, a discount offer, or an informational message.

6. The computer-server-based method of claim 1, wherein the marketing message is further based on one or more of: a geographical location of the mobile device, a merchant-identification code, user-account data associated with the mobile device, application data associated with the mobile device, or security parameters associated with the mobile device user.

7. The computer-server-based method of claim 1, wherein the marketing message is generated in accordance with one or more rules received at the mobile commerce platform from a merchant associated with the transaction.

8. A method of conducting a transaction, comprising:
   requesting, by a mobile device, a perishable transaction code from a computer server in connection with the transaction;
   receiving the perishable transaction code at the mobile device from the computer server;
   providing the perishable transaction code to a point of sale terminal to complete the transaction; and
   receiving a marketing message at the mobile device from the computer server, wherein the marketing message is based on a type of the transaction, historical transaction data associated with a user of the mobile device, and the request for the perishable transaction code.

9. The method of claim 8, wherein the type of the transaction comprises one or more of: a sale, a void, a gift card purchase, a credit, or a reload.

10. The method of claim 8, wherein receiving the marketing message occurs while the mobile device user is engaged in the transaction.

11. The method of claim 8, receiving the marketing message occurs after the transaction has completed.

12. The method of claim 8, wherein the marketing message comprises one or more of: a coupon, an advertisement, a discount offer, or an informational message.

13. The method of claim 8, wherein the marketing message is further based on one or more of: a geographical location of the mobile device, a merchant-identification code, user-account data associated with the mobile device, application data associated with the mobile device, or security parameters associated with the mobile device user.

14. A mobile commerce platform system for sending marketing messages to mobile-device users, the mobile commerce platform system comprising:
   at least one processor; and
   a memory comprising a plurality of program instructions executable by the at least one processor, the plurality of program instructions being configured to cause the at least one processor to:
   receive a request from a mobile device user for a perishable transaction code in connection with a transaction;
   determine a type of the transaction based on the request for the perishable transaction code;
   access historical transaction data associated with the mobile device user; and
   transmit a marketing message to a mobile device of the mobile device user, wherein the marketing message is based on the type of the transaction, the historical transaction data, and the request for the perishable transaction code.

15. The mobile commerce platform system of claim 14, wherein the type of the transaction comprises one or more of: a sale, a void, a gift card purchase, a credit, or a reload.

16. The mobile commerce platform system of claim 14, wherein transmitting the marketing message to the mobile device occurs while the mobile device user is engaged in the transaction.

17. The mobile commerce platform system of claim 14, wherein transmitting the marketing message to the mobile device occurs after the transaction has completed.

18. The mobile commerce platform system of claim 14, wherein the marketing message comprises one or more of: a coupon, an advertisement, a discount offer, or an informational message.

19. The mobile commerce platform system of claim 14, wherein the marketing message is further based on one or more of: a geographical location of the mobile device, a merchant-identification code, user-account data associated with the mobile device, application data associated with the mobile device, or security parameters associated with the mobile device user.

20. The mobile commerce platform system of claim 14, wherein the marketing message is generated in accordance with one or more rules received at the mobile commerce platform from a merchant associated with the transaction.

* * * * *